US010882518B2

(12) United States Patent
Saiki

(10) Patent No.: US 10,882,518 B2
(45) Date of Patent: Jan. 5, 2021

(54) COLLISION AVOIDANCE ASSIST APPARATUS

(71) Applicant: TOYOTA JIDOSHA KABUSHIKI KAISHA, Toyota (JP)

(72) Inventor: Kotaro Saiki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 182 days.

(21) Appl. No.: 16/145,821

(22) Filed: Sep. 28, 2018

(65) Prior Publication Data

US 2019/0100197 A1 Apr. 4, 2019

(30) Foreign Application Priority Data

Sep. 29, 2017 (JP) ................................. 2017-189290

(51) Int. Cl.
*B60W 30/09* (2012.01)
*B60Q 9/00* (2006.01)
(Continued)

(52) U.S. Cl.
CPC ............. *B60W 30/09* (2013.01); *B60Q 9/008* (2013.01); *G01C 21/20* (2013.01); *G05D 1/0061* (2013.01);
(Continued)

(58) Field of Classification Search
CPC ............. B60W 30/09; B60W 2554/00; B60W 2710/18; B60W 2710/20; B60W 2520/10; B60W 10/06; B60W 10/10; B60W 10/20; B60W 10/18; B60W 50/14; B60W 50/0097; B60W 30/08; B60W 30/095; B60W 30/0953; B60W 30/0956; B60W 2520/105; B60W 2520/14; B60W 2540/18; B60W 2050/143; B60W 2050/146; B60W 40/02; B60Q 9/008; G05D 1/0061; G05D 1/0212; G05D 2201/0213; G01C 21/20; G01S 13/931; G01S 2013/9318; G01S 2013/9319; G01S 2013/93185; G01S 2013/93271; G01S 13/867; B62D 15/0265;
(Continued)

(56) References Cited

U.S. PATENT DOCUMENTS

2007/0112516 A1* 5/2007 Taniguchi ............. G08G 1/166 701/301
2008/0086269 A1* 4/2008 Joe ..................... B62D 15/0265 701/301
(Continued)

FOREIGN PATENT DOCUMENTS

JP 2007-137116 A 6/2007

*Primary Examiner* — Jess Whittington
*Assistant Examiner* — Brian E Yang
(74) *Attorney, Agent, or Firm* — Sughrue Mion, PLLC

(57) ABSTRACT

An avoidance route calculation part calculates an avoidance route for avoiding a collision between an own vehicle and an obstacle through a collision avoidance assist control (an automatic brake control and an automatic steering control). A post-avoidance route calculation part calculates a post-avoidance route. A post-avoidance route collision determination part determinates whether a secondary obstacle is present on the post-avoidance route. When the secondary obstacle is determined to be present, the automatic steering control is prohibited from being performed.

9 Claims, 11 Drawing Sheets

(51) Int. Cl.
*G05D 1/00* (2006.01)
*G05D 1/02* (2020.01)
*G01C 21/20* (2006.01)

(52) U.S. Cl.
CPC ....... *G05D 1/0212* (2013.01); *B60W 2554/00* (2020.02); *B60W 2710/18* (2013.01); *B60W 2710/20* (2013.01); *G05D 2201/0213* (2013.01)

(58) Field of Classification Search
CPC .. G08G 1/165; G08G 1/166; B60T 2201/022; B60T 8/17; B60T 7/22; B60T 7/00
See application file for complete search history.

(56) References Cited

U.S. PATENT DOCUMENTS

| | | | | |
|---|---|---|---|---|
| 2009/0076673 | A1* | 3/2009 | Brabec | B60W 10/18<br>701/23 |
| 2014/0316668 | A1* | 10/2014 | Akiyama | B60T 7/22<br>701/70 |
| 2015/0253778 | A1* | 9/2015 | Rothoff | B60W 50/14<br>701/25 |
| 2017/0106876 | A1* | 4/2017 | Gordon | B60W 30/182 |
| 2017/0183004 | A1* | 6/2017 | Bonarens | B60W 30/09 |
| 2019/0033860 | A1* | 1/2019 | Okimoto | G05D 1/0088 |

* cited by examiner

COLLISION AVOIDANCE ASSIST APPARATUS

BACKGROUND OF THE INVENTION

1. Field of the Invention

The present invention relates to a collision avoidance assist apparatus for assisting a driver so as to avoid a collision between an own vehicle and an obstacle.

2. Description of the Related Art

A vehicle which comprises a conventional collision avoidance assist apparatus is known (for example, refer to Japanese Patent Application Laid-open (Kokai) No. 2007-137116). The conventional collision avoidance assist apparatus firstly causes a buzzer to generate a sound to thereby alert a driver of an own vehicle, when an obstacle with which an own vehicle is highly likely to collide is detected by an ambient sensor such as a camera and a radar. Thereafter, when the probability of the collision between the own vehicle and the obstacle becomes higher, the conventional collision avoidance assist apparatus decelerates the own vehicle through performing an automatic brake control to, for example, generate a braking force even when the driver does not press down a brake pedal. In addition to the automatic brake control, another conventional collision avoidance assist apparatus performs an automatic steering control to steer the own vehicle in such a manner that the own vehicle moves away from the obstacle. Each of those controls that the collision avoidance assist apparatuses perform is referred to as a "collision avoidance assist control".

The collision avoidance assist control is stopped/terminated when the probability of the collision between the own vehicle and the obstacle disappears. Therefore, the collision avoidance assist control is stopped/terminated when the automatic steering control has changed a traveling direction of the own vehicle so that the own vehicle does not approach the obstacle any more. When the collision avoidance assist control is stopped/terminated, driving operations are entrusted to the driver. In other words, the driving operations are handed over to the driver.

For example, as shown in FIG. 11, in a case where the collision avoidance assist control including the automatic steering control is performed to avoid the collision with a guardrail (crash barrier) as the obstacle, the probability of the collision between the own vehicle and the guardrail disappears when the direction of the own vehicle becomes in parallel to the guardrail. Therefore, the collision avoidance assist control is stopped/terminated when the direction of the own vehicle becomes in parallel to the guardrail.

As described above, when the collision avoidance assist control is stopped/terminated, the driving operations are entrusted to the driver. In this case, when an another obstacle (referred to a "secondary obstacle") is present ahead of the own vehicle whose moving/traveling direction has been changed by the automatic steering control, and there is not enough time for the driver to perform the driving operations to avoid the collision with the secondary obstacle, the possibility of the collision with the secondary obstacle may be high.

Generally, the driver feels discomfort when the collision avoidance control starts to be performed at a time point before the driver starts the driving operation to avoid the collision with the obstacle which the driver has recognized. Therefore, the collision avoidance assist control is not started relatively early. For this reason, when the collision between the own vehicle and the obstacle is avoided owing to the automatic steering control, a case may arise where the own vehicle has not been sufficiently decelerated (i.e., the vehicle speed is still high). In this case, as described above, the collision (hereinafter, referred to as a "secondary collision") with the secondary obstacle may not be able to be avoided through the driving operations of the driver. Even if the conventional collision avoidance assist apparatus is configured to start again the collision avoidance assist control to avoid the secondary collision with the secondary obstacle, there is a high possibility that the collision may not be able to be avoided when there is not enough time for the collision avoidance assist apparatus to perform the collision avoidance assist control to avoid the secondary collision.

SUMMARY OF THE INVENTION

The present invention is made to solve the problem mentioned above, and has an object to reduce a possibility of an occurrence of the secondary collision.

A collision avoidance assist apparatus according to the present invention comprises:

obstacle detection means (14, 71) configured to detect an obstacle which is present ahead of an own vehicle;

alert means (S52, S53) configured to alert a driver when a collision probability of a collision of the own vehicle with said detected obstacle becomes high;

avoidance route calculation means (S32) configured to calculate an avoidance route for avoiding said collision between the own vehicle and the detected obstacle;

collision avoidance assist control means (10) configured to perform a collision avoidance assist control including an automatic brake control (S62, S63) and an automatic turn control when the collision probability becomes high, the automatic brake control being a control for generating a braking force at respective wheels, and the automatic turn control (S72, S73) being a control for changing a traveling direction of the own vehicle in such a manner that the own vehicle travels along the avoidance route;

post-avoidance route calculation means (S33-S36) configured to calculate, as a termination position (Pe) of the avoidance route, a position at which the collision between the own vehicle and the obstacle is predicted to have been avoided on the assumption that the own vehicle travels along the avoidance route, and calculate, as a post-avoidance route, a route along which the own vehicle is predicted to travel for a period from a first time point at which the own vehicle passes through the termination position to a second time point at which a setting time elapses since the first time point;

post-avoidance route collision determination means (S37) configured to determine whether or not another obstacle having a high collision probability of a collision of the own vehicle with the another obstacle is present on the assumption that the own vehicle travels along the post-avoidance route; and prohibition means (S38, S40) configured to prohibit the collision avoidance assist control means from performing the automatic turn control when the post-avoidance route collision determination means determines that the another obstacle is present.

The obstacle detection means is configured to detect an obstacle which is present ahead of an own vehicle. The alert means is configured to alert the "driver of the own vehicle", when a collision probability of the own vehicle colliding with the detected obstacle becomes high (i.e., when there is a sufficiently high probability of a collision between the own vehicle and the detected obstacle). The avoidance route calculation means is configured to calculate the avoidance route which enables the own vehicle to avoid the collision between the own vehicle and the detected obstacle. The collision avoidance assist control means is configured to perform the collision avoidance assist control including the automatic brake control and the automatic turn control when the collision probability becomes (sufficiently) high. The automatic brake control is the control for generating a braking force at respective wheels. The automatic turn control is the control for changing a traveling direction of the own vehicle in such a manner that the own vehicle travels along the avoidance route. Accordingly, the own vehicle can be decelerated and travel along the avoidance route through the collision avoidance assist control.

For example, the automatic turn control is preferably an automatic steering control for changing the traveling direction of the own vehicle through controlling a steering angle of the own vehicle, however, the automatic turn control may be a differential braking force control for generating a difference between braking forces of right wheels and braking forces of left wheels to thereby change the traveling direction of the own vehicle. The automatic brake control and the automatic turn control do not need to be started at the same time. It is preferable that a start condition for the automatic brake control be independent from a start condition for the automatic turn control.

There is a case where another (new) obstacle (the secondary obstacle) is present with respect to (or on) a traveling route of the own vehicle after the collision with a first obstacle has been avoided through the collision avoidance support control with respect to the first obstacle. The collision with the secondary obstacle can be avoided through the driver's driving operation(s) with respect to the secondary obstacle, if the driver can start the driving operation(s) immediately thereafter. Alternatively, the collision with the secondary obstacle can be avoided through the collision avoidance assist control with respect to the secondary obstacle, if the collision avoidance assist control can be started immediately thereafter. However, when the secondary obstacle has appeared, prior to a state where the driver can instantly start the collision avoidance operation for avoiding the secondary obstacle and/or prior to a state where the collision avoidance assist control for avoiding the secondary obstacle is instantly started, the probability that the own vehicle may collide with the secondary obstacle remains high.

In view of the above, the collision avoidance assist apparatus according to the present invention comprises the post-avoidance route calculation means, the post-avoidance route collision determination means, and the prohibition means. The post-avoidance route calculation means calculates the termination position of the avoidance route. The termination position of the avoidance route is a position at which the collision between the own vehicle and the obstacle is predicted to have been avoided on the avoidance route on the assumption that the own vehicle travels along the avoidance route. Furthermore, the post-avoidance route calculation means calculates the post-avoidance route. The post-avoidance route is a route along which the own vehicle is predicted to travel for a period from a first time point at which the own vehicle passes through the termination position to a second time point at which a setting time elapses since the first time point. At least, the automatic turn control is terminated/stopped when the own vehicle reaches the termination position. Thus, the post-avoidance route is the predicted route of the own vehicle after the automatic turn control is terminated.

The post-avoidance route collision determination means determines whether or not another (new) obstacle (i.e., the secondary obstacle) having a high collision probability of the collision with the own vehicle is present on the assumption that the own vehicle travels along the post-avoidance route. For example, the post-avoidance route collision determination means determines whether or not another obstacle is present on the post-avoidance route. The prohibition means prohibits the collision avoidance assist control means from performing the automatic turn control when it is determined that the another obstacle having the high collision probability of the collision with the own vehicle is present. That is, the prohibition means prohibits performing the automatic turn control to change the traveling direction of the own vehicle.

According to thus configured present invention, a possibility of the occurrence of the secondary collision (i.e., the collision of the own vehicle colliding with the secondary obstacle) can be reduced.

In some embodiments, the collision avoidance assist apparatus comprises setting time calculation means (S34, S35) configured to:

have stored in advance a driver response required time (Treq) which is a time from a time point at which the alert is started by the alert means to a time point at which the driver can start a driving operation for avoiding a collision between the own vehicle and an obstacle;

calculate a remaining time Td (=Treq−Tpcs) obtained by subtracting, from the driver response required time (Treq), a time (Tpcs) from a time point at which an alert is started by the alert means to a time point at which the own vehicle passes through the termination position; and set the setting time to the calculated remaining time.

The setting time calculation means has stored in advance the driver response required time (Treq) which is a time from a time point at which the alert is started by the alert means to a time point at which the driver can start a driving operation for avoiding a collision between the own vehicle and an obstacle; calculates a remaining time Td (=Treq−Tpcs) obtained by subtracting, from the driver response required time (Treq), a time (Tpcs) from a time point at which an alert is started by the alert means to a time point at which the own vehicle passes through the termination position; and sets the setting time to the calculated remaining time. Therefore, the setting time can be an appropriate time so that the post-avoidance route can be calculated appropriately.

In some embodiments, the post-avoidance route calculation means is configured to use, as the setting time, a time which has been set based on an assist control handing over time (Tc) which is a time from a time point at which the own vehicle passes through the termination position to a time point at which the collision avoidance assist control for avoiding a newly detected obstacle can be started.

In this manner, in some embodiments, the setting time has been set based on the assist control handing over time (Tc). Therefore, the setting time can be an appropriate time so that the post-avoidance route can be calculated appropriately.

In some embodiments, the post-avoidance route calculation means is configured to calculate the post-avoidance route on the assumption that the own vehicle travels for the setting time at a "vehicle speed of the own vehicle (detected) when the own vehicle passes through the termination position" with keeping a "turning angle when the own vehicle passes through the termination position".

In some embodiments, the collision avoidance assist apparatus is configured to terminate/stop both of the automatic turn control and the automatic brake control at the same time when the own vehicle arrives at the termination position of the avoidance route. In this case, the post-avoidance route calculation means calculates the post-avoidance route on the assumption that the own vehicle travels for the setting time at a vehicle speed which is the same as a vehicle speed when the own vehicle passes through (reaches) the termination position and a traveling direction (i.e., a moving direction of the own vehicle, a turning angle) which is the same as a traveling direction when the own vehicle passes through (reaches) the termination position. Therefore, the post-avoidance route can be calculated appropriately.

In some embodiments, the post-avoidance route calculation means is configured to calculate the post-avoidance route on the assumption that the own vehicle is decelerated at a given (constant) deceleration for the setting time with keeping a turning angle when the own vehicle passes through the termination position.

In some embodiments, the collision avoidance assist apparatus is configured to terminate/stop the automatic turn control when the own vehicle arrives at the termination position of the avoidance route, but to continue performing the automatic brake control thereafter. In this case, the post-avoidance route calculation means calculates the post-avoidance route on the assumption that the own vehicle is decelerated at a given (constant) deceleration for the setting time with keeping a turning angle when the own vehicle passes through the termination position. Therefore, the post-avoidance route can be calculated appropriately. It should be noted that the given deceleration is preferably set to a target deceleration of (or used in) the automatic brake control.

In the descriptions given above, in order to facilitate understanding of the present disclosure, reference numerals used in the embodiments are added in parenthesis to the elements of the present disclosure corresponding to the embodiments. However, the respective elements of the present disclosure are not limited to the embodiment defined by the reference numerals.

DESCRIPTION OF THE EMBODIMENTS

Figure 1:
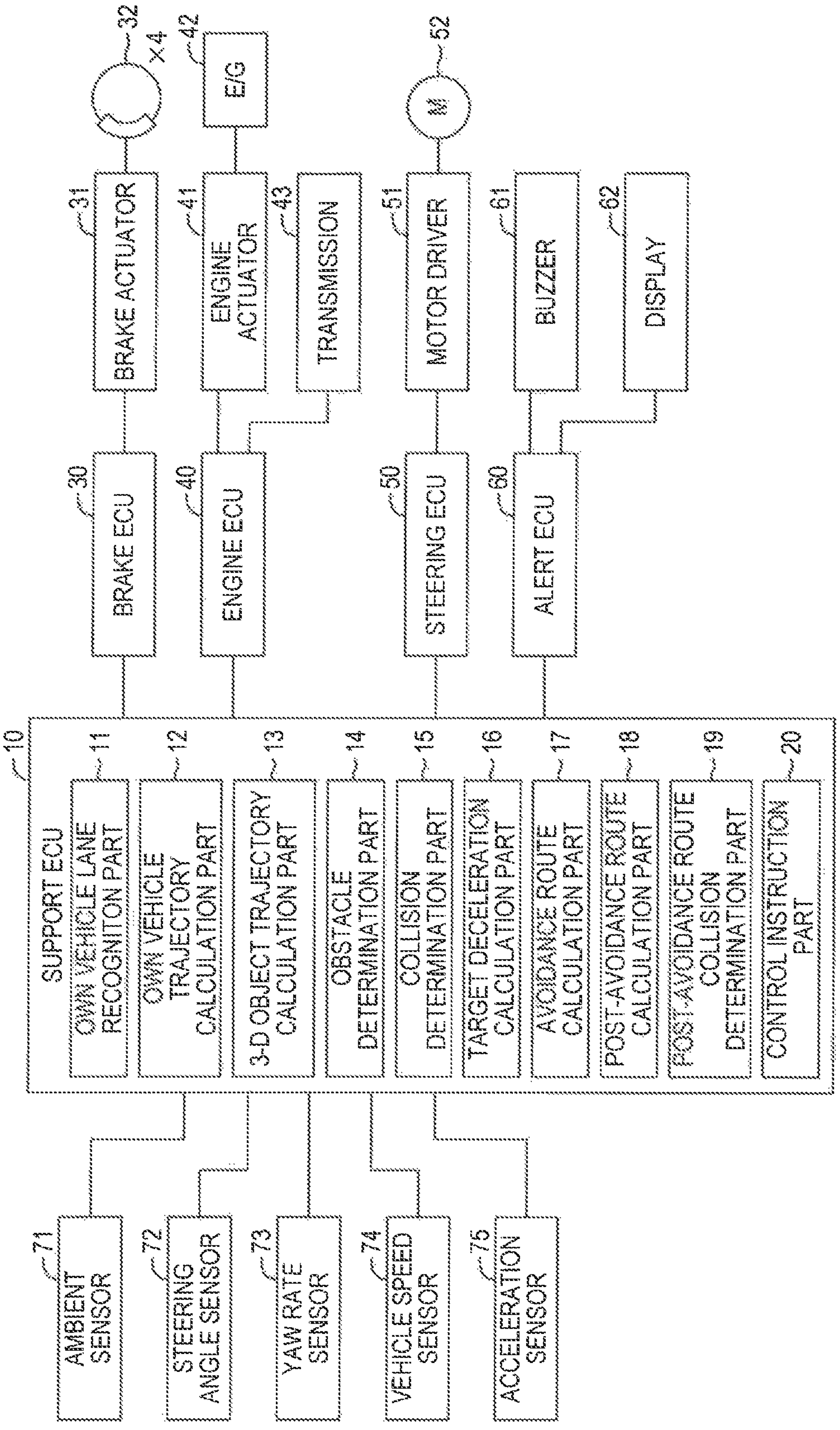
FIG. 1 is a schematic system configuration diagram for illustrating a collision avoidance assist apparatus according to an embodiment of the present invention.

A present embodiment of the present invention will next be described with reference to the drawings. FIG. 1 is a schematic system configuration diagram of a collision avoidance assist apparatus according to the present embodiment.

The collision avoidance assist apparatus includes a support ECU 10, a brake ECU 30, an engine ECU 40, a steering ECU 50, and an alert ECU 60. Each of the ECUs 10, 30, 40, 50, and 60 includes a microcomputer as a main part, and is connected so as to be capable of mutually transmitting and receiving various types of control information and request signals (instructions) via an unillustrated controller area network (CAN). The ECU is an abbreviation for an Electronic Control Unit. The microcomputer includes a CPU, a memory device (a ROM, a RAM, and the like). The CPU is configured to execute instructions (programs) stored in the ROM to thereby implement various functions. The vehicle in which the collision avoidance assist apparatus is installed is referred to as an "own vehicle" in the present specifications.

The support ECU 10 is connected to an ambient sensor 71, a steering angle sensor 72, a yaw rate sensor 73, a vehicle speed sensor 74, and an acceleration sensor 75. The ambient sensor 71 has a function for acquiring information with respect to at least a road ahead of the own vehicle and three-dimensional (3-D) objects which are present on the road. For example, the 3-D objects includes moving objects such as pedestrians, bicycles, and vehicles, and stationary objects such as utility poles, trees, and guardrails (or crash barriers)

For example, the ambient sensor 71 includes a radar sensor and a camera sensor. The radar sensor emits/transmits radio waves in the millimeter-wave band toward surroundings of the own vehicle (which include at least an area ahead of the own vehicle). A 3-D object present in the surroundings of the own vehicle reflects the emitted radio waves to generated reflected waves. The radar sensor receives the reflected waves from the 3-D object, determines presence or absence of the 3-D object, and calculates/acquires relative relationships (i.e., a distance between the own vehicle and the 3-D object, a direction of the 3-D object relative to the own vehicle, a relative velocity between the own vehicle and the 3-D object, and the like) between the own vehicle and the 3-D object, and a size (width) of the 3-D object, based on the received reflected wave.

For example, the camera sensor includes a stereo camera to photograph (take a picture of) the right and left landscapes ahead of the own vehicle, and calculates, based on the left and right image data of the right and left landscapes, a shape of the road, presence or absence of the 3-D object, the relative relationships between the own vehicle and the 3-D object, and the size (width) of the 3-D object. In addition, the camera sensor recognizes lane markers (hereinafter referred to as "white lines") such as right and left white lines on the road, and calculates a shape of the road and a positional relationship between the road and the own vehicle, using the recognized white lines.

The information acquired by the ambient sensor 71 is referred to as "target object information". The ambient sensor 71 transmits the target object information repeatedly to the support ECU 10 at a predetermined interval. Note that, the ambient sensor 71 does not necessarily include both of the radar sensor and the camera sensor. A sensor which satisfies a required detection accuracy may be used as the ambient sensor 71. Information from a navigation system is also available to calculate the shape of the road on which the own vehicle is traveling and the information indicative of the positional relationships between the road and the own vehicle.

The steering angle sensor 72 detects a steering angle of the own vehicle and transmits the detected signal to the support ECU 10. The yaw rate sensor 73 detects a yaw rate which acts on the own vehicle and transmits the detected signal to the support ECU 10. The vehicle speed sensor 74 detects a traveling speed (referred to as "vehicle speed") of the own vehicle and transmits the detected signal to the support ECU 10. The acceleration sensor 75 detects a longitudinal acceleration which is the acceleration of the own vehicle in a longitudinal direction of the own vehicle, and transmits the detected signal to the support ECU 10. The acceleration sensor 75 also detects a lateral acceleration which is the acceleration of the own vehicle in a right-left direction (a body width direction) of the own vehicle, and transmits the detected signal to the support ECU 10. The vehicle speed sensor 74 calculates the vehicle speed based on counter values obtained by counting pulse signals of wheel speed sensors provided for the respective wheels of the own vehicle. Alternatively, the collision avoidance assist apparatus may be configured to calculate the vehicle speed based on the pulse signals of wheel speed sensors.

The support ECU 10 detects obstacles present in front of (ahead of) the own vehicle based on the signals detected by those sensors. When the support ECU 10 determines that the own vehicle is likely to collide with the obstacle (i.e., when it is determined that a probability of the collision of the own vehicle with the obstacle is sufficiently high), the support ECU 10 transmits an instruction for decelerating the own vehicle to the brake ECU 30 and the engine ECU 40, and transmits a steering instruction for avoiding the collision to the steering ECU 50 as necessary. The processing of the support ECU 10 will be described later.

The brake ECU 30 is connected to a brake actuator 31. The brake actuator 31 is arranged in a hydraulic circuit between a master cylinder (not shown) which pressurizes a hydraulic oil through a pressing force applied to a brake pedal and a friction brake mechanism 32 installed in each of front-rear and right-left wheels. The friction brake mechanism 32 has a brake disc fixed to the wheel and a brake caliper fixed to the vehicle body. The friction brake mechanism 32 activates a wheel cylinder installed in the brake caliper using a hydraulic pressure of the hydraulic oil supplied from the brake actuator 31 to thereby press a brake pad to the brake disc for generating a hydraulic braking force (a friction braking force). Thus, the brake ECU 30 can control the braking force of the own vehicle through controlling the brake actuator 31 even when the brake pedal is not operated/pressed down.

The engine ECU 40 is connected to an engine actuator 41 and a transmission 43. The engine ECU 40 controls the engine actuator 41 and the transmission 43 to vary a driving torque generated by the engine 42 and a gear ratio of the transmission 43. Thereby, the engine ECU 40 adjusts a driving force of the own vehicle so as to control an acceleration/deceleration of the own vehicle.

The steering ECU 50 is a control device for controlling an electric power steering system and is connected to a motor driver 51. The motor driver 51 is connected to a steering motor 52. The steering motor 52 is installed in a steering mechanism (not shown). The steering motor 52 rotates a rotor using an electric power supplied from the motor driver 51 to thereby steer/turn the right and left steered/turning wheels.

The steering ECU 50 normally detects the steering torque generated by the driver to cause the steering motor 52 to generate an assist torque corresponding to the steering torque. When the steering ECU 50 receives a "steering instruction for the collision avoidance" transmitted from the support ECU 10 while the driver does not operate the steering wheel, the steering ECU 50 drives the steering motor 52 in response to the steering instruction to thereby steer/turn the steered/turning wheels.

The alert ECU 60 is connected to a buzzer 61 and a display device 62. The alert ECU 60 causes the buzzer 61 to generate a buzzer sound to thereby alert the driver and displays an operation status of the collision avoidance support control on the display device 62, in response to an alert instruction transmitted from the support ECU 10, when the own vehicle is likely to collide with the obstacle.

Next, functions of the support ECU 10 will be described. In terms of the functions of the support ECU 10, the support ECU 10 includes an own vehicle lane recognition part/unit 11, an own vehicle trajectory calculation part/unit 12, a 3-D object trajectory calculation part/unit 13, an obstacle determination part/unit 14, a collision determination part/unit 15, a target deceleration calculation part/unit 16, an avoidance route calculation part/unit 17, a post-avoidance route/path calculation part/unit 18, a post-avoidance route collision determination part/unit 19, and a control instruction part/unit 20.

The own vehicle lane recognition part 11 generates information regarding a road (e.g., information on a ground surface) on which the own vehicle is going to travel, based on the target object information transmitted from the ambient sensor 71. The own vehicle lane recognition part 11 generates coordinate information (positional information) of the ground surface, the 3-D objects, and the white lines (including a right-side white line and a left-side white line), wherein the coordinates of them are represented by using a two-dimensional coordinate system. The origin (original point) of the two-dimensional coordinate system is a front center position of the own vehicle. An axis of the two-dimensional coordinate system extends in parallel with a lateral (left-right, width) direction of the own vehicle. The other axis of the two-dimensional coordinate system extends forwardly in parallel with a longitudinal (front-rear) direction of the own vehicle. The own vehicle lane recognition part 11 recognizes/acquires a shape of a "travelling lane of the own vehicle" defined by the right-side white line and the left-side white line, a position and a direction of the own vehicle in (with respect to) the traveling lane, and relative positions of the ground surface and the 3-D objects with respect to the own vehicle. The own vehicle lane recognition part 11 updates the coordinate information every time the own vehicle lane recognition part 11 receives the target object information transmitted from the ambient sensor 71.

The own vehicle trajectory calculation part 12 calculates a turning radius of the own vehicle based on the yaw rate detected by the yaw rate sensor 73 and the vehicle speed detected by the vehicle speed sensor 74. In addition, the own vehicle trajectory calculation part 12 calculates/predicts/extrapolates an own vehicle trajectory which represents positional variations of the own vehicle in a period from a present time point to a time point at which a predetermined time elapses from the present time point, based on the calculated turning radius. The own vehicle trajectory is calculated so as to have a predetermined width in a direction perpendicular to the traveling direction of the own vehicle in a plan view. Hereinafter, the thus calculated trajectory of the own vehicle is referred to as an "own vehicle predicted trajectory".

The 3-D object trajectory calculation part 13 determines whether a 3-D object is a moving object or a stationary object, based on the positional variation of the 3-D object and/or features of the 3-D object included in the image of the 3-D object. When it is determined that the 3-D object is the moving object, the 3-D object trajectory calculation part 13 calculates the trajectory of that 3-D object. For example, a moving speed of the 3-D object in the longitudinal direction (i.e., the traveling direction of the own vehicle) can be calculated based on the relationship between the vehicle speed of the own vehicle and the relative speed of the 3-D object in relation to the own vehicle. Further, a moving speed of the 3-D object in the lateral direction can be calculated based on a change amount in the distance between a side-end position of the 3-D object detected by the ambient sensor 71 and the white line(s). The 3-D object trajectory calculation part 13 calculates/predicts/extrapolates, based on the moving speed of the 3-D object in the longitudinal direction and the moving speed of the 3-D object in the lateral direction, a "trajectory of the 3-D object" which represents positional variations of the 3-D object in the period from the present time point to the time point at which the predetermined time elapses from the present time point, Hereinafter, the thus calculated trajectory of the 3-D object is referred to as a "3-D object predicted trajectory". The 3-D object trajectory calculation part 13 may acquires the 3-D object predicted trajectory based on the calculated own vehicle predicted trajectory and the distance between the own vehicle and the 3-D object detected by the ambient sensor 71.

The obstacle determination part 14 determines whether or not there is a high probability (i.e., collision probability) of a collision between the own vehicle and the 3-D object which is the moving object, based on the own vehicle predicted trajectory and the 3-D object predicted trajectory, on the premise that the 3-D object maintains a current moving state and the own vehicle maintains a current traveling state, In other words, the obstacle determination part 14 determines that the own vehicle is likely to collide with the 3-D object when the own vehicle predicted trajectory and the 3-D object predicted trajectory interfere/intersect with each other. Furthermore, the obstacle determination part 14 determines whether or not there is a high probability (i.e., collision probability) of a collision between the own vehicle and the 3-D object which is the stationary object, based on the own vehicle predicted trajectory and the position of the 3-D object, on the premise that the 3-D object maintains a stationary state and the own vehicle maintains the current traveling state, In other words, the obstacle determination part 14 determines that the own vehicle is likely to collide with the 3-D object (stationary object) when the own vehicle predicted trajectory and the position of the 3-D object (stationary object) interfere/intersect with each other.

When the obstacle determination part 14 determines that there is a high probability (i.e., collision probability) of a collision between the own vehicle and the 3-D object (or the own vehicle is likely to collide with the 3-D object) (regardless of whether the 3-D object is the moving object or the stationary object), the obstacle determination part 14 regards that 3-D object as an obstacle, based on the above determination result. Hereinafter, "regarding the 3-D object as the obstacle" is expressed as "detecting the obstacle".

When the obstacle determination part 14 detects the obstacle, the collision determination part 15 calculates, based on the distance L between the obstacle and the own vehicle and the relative speed Vr of the own vehicle to the obstacle, a time-to-collision (TTC) which is a predicted time (remaining time) from the preset time point to a time point at which the own vehicle is predicted to collide with the obstacle in accordance with the following equation (1).

$$TTC=L/Vr \qquad (1)$$

The time-to-collision TTC is used as an index value which indicates/represents the probability of a collision between the own vehicle collides and the obstacle (or the probability of the collision of the own vehicle with the obstacle). As the time-to-collision TTC is shorter/smaller, the probability of the collision of the own vehicle with the obstacle can be determined to be higher. The collision determination part 15 determines that the probability of the collision of the own vehicle with the obstacle is sufficiently high, when the time-to-collision TTC is equal to or shorter/smaller than a predetermined collision determining threshold value. It should be noted that the time-to-collision TTC is infinite (∞) when the relative speed Vr is a speed which indicates a distance between the own vehicle and the obstacle becomes longer (i.e., the own vehicle is moving in a direction in which the own vehicle recedes from the obstacle).

In the present embodiment, two of the collision determining threshold values are used. That is, a first collision determining threshold value TTC1 and a second collision determining threshold value TTC2 are used. The second collision determining threshold value TTC2 is shorter/smaller than the first collision determining threshold value TTC1 (TTC2<TTC1).

When the obstacle determination part 14 detects the obstacle and the time-to-collision TTC becomes equal to or smaller than the first collision determination threshold value TTC1, the collision determination part 15 determines that "the probability of the collision of the own vehicle with the obstacle is sufficiently high". The collision determination part 15 supplies the determination result (i.e., TTC≤TTC1) to the control instruction part 20. When the control instruction part 20 receives that determination result (i.e., TTC≤TTC1), the control instruction part 20 transmits the alert instruction to the alert ECU 60. When the alert ECU 60 receives the alert instruction, the alert ECU 60 causes the buzzer 61 to generate the buzzer sound for a predetermined time period, and displays the operational status of the collision avoidance assist control on the display device 62. For example, letters of "BRAKE!" is displayed on the display device 62 in order to urge the driver to operate (press down) the brake pedal.

When the obstacle determination part 14 detects the obstacle, the target deceleration calculation part 16 calculates a target deceleration for decelerating the own vehicle. For example, when the obstacle is the stationary object, a traveling distance X required for the vehicle to stop can be expressed by the following equation (2). Here, "V" is a current vehicle speed (which in this case is equal to the relative speed) of the own vehicle. "a" is a deceleration of the own vehicle. "t" is a time from the present time point to a time point at which the own vehicle stops (or the vehicle speed becomes zero).

$$X=V\cdot t+(1/2)\cdot a\cdot t^2 \qquad (2)$$

The time t from the present time point to the time point at which the own vehicle stops is expressed by the following equation (3).

$$t=-V/a \quad (3)$$

Therefore, the deceleration "a" required to stop the own vehicle when the vehicle travels for the traveling distance D is expressed by the following equation (4) through substituting the equation (3) for the equation (2).

$$a=-V^2/2D \quad (4)$$

In order to stop the own vehicle at a position in front of the obstacle by a distance β away from the obstacle toward the own vehicle, the traveling distance D in the equation (4) may be set to a distance (L−β) obtained by subtracting the distance β from the distance L detected by the ambient sensor 71. When the obstacle moves (i.e., the obstacle is the moving object), the deceleration "a" may be calculated using the relative speed Vr in place of the vehicle speed V.

The target deceleration calculation part 16 sets the target deceleration to the thus calculated deceleration "a". Meanwhile, there is a limit (e.g. about −1G) of the deceleration that the vehicle can realize. Thus, when an absolute value of the calculated target deceleration is larger than a predetermined upper limit value, the absolute value of the target deceleration is set to the predetermined upper limit value.

When the time-to-collision TTC is equal to or smaller than the second collision determination threshold value TTC2 after the alert ECU 60 has activated the buzzer 61 and the display device 62, the collision determination part 15 determines that "the probability of the collision of the own vehicle with the obstacle becomes much higher". The alert ECU 60 supplies the determination result (TTC≤TTC2) to the control instruction part 20. When the control instruction part 20 receives the determination result (i.e., TTC≤TTC2), the control instruction part 20 transmits a "braking instruction which includes information on the target deceleration calculated by the target deceleration calculation part 16" to the brake ECU 30, and transmits, to the engine ECU 40, a zero torque instruction for requiring the engine ECU 40 to change the driving torque to zero. When the brake actuator 31 receives the braking instruction, the brake ECU 30 controls the brake actuator 31 in such a manner that the actual deceleration of the own vehicle follows (or becomes equal to) the target deceleration. When the engine ECU 40 receives the zero torque instruction, the engine ECU 40 controls the engine actuator 41 and the transmission 43 in such a manner that the driving torque (or the driving force) becomes zero. In this manner, the automatic brake control is performed.

When the obstacle determination part 14 detects the obstacle, the avoidance route calculation part 17 calculates/determines an avoidance route/path along which the own vehicle can travel in order to avoid the collision with the obstacle. For example, the avoidance route calculation part 17 calculates the avoidance route which is expressed using "a distance in a longitudinal direction (direction of a longitudinal axis of the own vehicle body) between the own vehicle and the obstacle, and a change amount (or a deviation) of a distance in a lateral direction (direction perpendicular to the longitudinal direction) of the obstacle relative to the own vehicle" obtained every time a constant interval elapses from the present time point.

The "distance in the longitudinal direction between the own vehicle and the obstacle" obtained every time the constant interval elapses from the present time point can be calculated, based on "the distance in the longitudinal direction between the own vehicle and the obstacle, the relative speed in the longitudinal direction between the own vehicle and the obstacle, and the target deceleration calculated by the target deceleration calculation part 16" at the present time point. In some embodiments, the distance in the longitudinal direction described above is calculated in consideration of a differential value of the target deceleration.

The "change amount (deviation) of the distance in the lateral direction of the obstacle relative to the own vehicle" every time the constant interval elapses from the present time point can be calculated, based on "the lateral position of the obstacle from the own vehicle (i.e., the distance in the lateral direction between the own vehicle and the obstacle), a relative speed in the lateral direction between the own vehicle and the obstacle, and a target yaw rate described later" at the present time point. In some embodiments, the distance in the lateral direction described above is calculated in consideration of a differential value of the target yaw rate.

The traveling route of the own vehicle with respect to the obstacle is expressed as a line obtained by plotting "the distance in the longitudinal direction between the own vehicle and the obstacle, and the change amount of the distance in the lateral direction of the obstacle relative to the own vehicle" obtained every time the constant interval elapses, on the two-dimensional coordinate.

Figure 2:
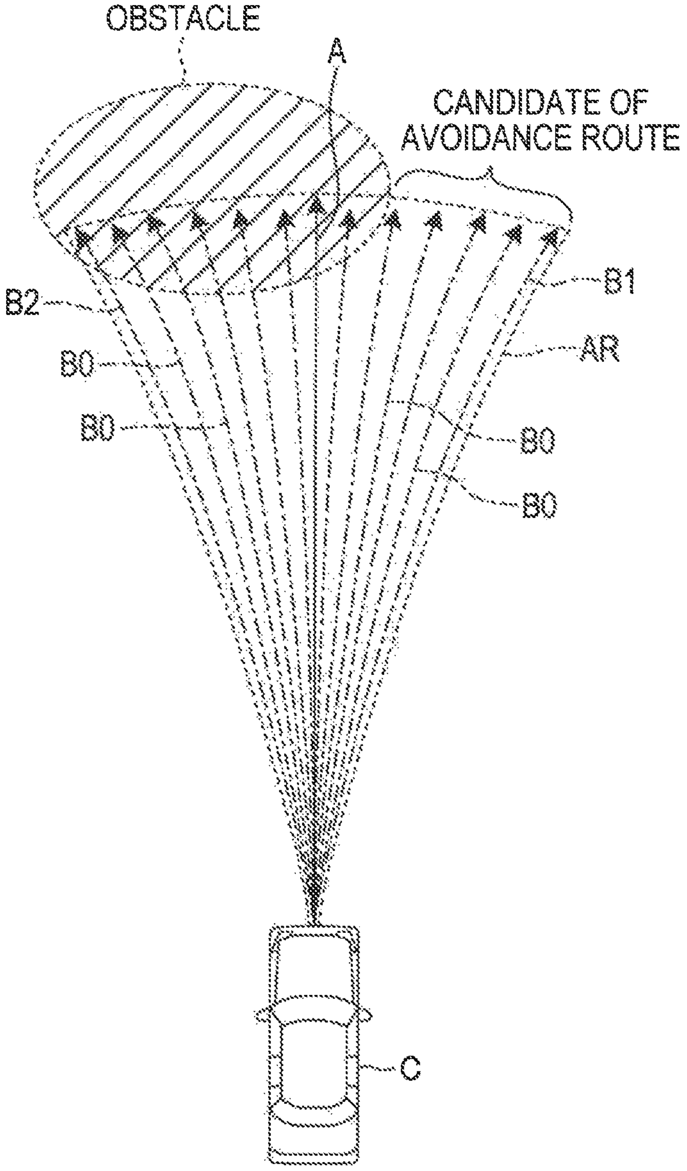
FIG. 2 is a top (plan) view for illustrating an avoidance route of an own vehicle.

At a start timing of the calculation for the avoidance route, the avoidance route calculation part 17 regards/treats the actual yaw rate detected by the yaw rate sensor 73 as an initial target yaw rate so as to calculate a "route A (referred to as a "non-steering assist route A") of the own vehicle", as shown in FIG. 2, in a case where an steering control for the avoiding the obstacle (i.e., avoiding using steering) is not performed. The non-steering assist route A interferes with the obstacle. Therefore, in order to acquire a route which does not interfere with the obstacle, the avoidance route calculation part 17 calculates a plurality of routes B0 with varying the yaw rate (target yaw rate) of the own vehicle by a constant amount. In other words, the avoidance route calculation part 17 calculates each of the routes B0 every time the target yaw rate is changed by the constant amount.

The automatic steering control for avoiding the collision of the own vehicle with the obstacle is allowed to vary/change the yaw rate of the own vehicle by at most a maximum variation amount Δγ from the present actual yaw rate. The maximum variation amount Δγ is the largest value among the variation amounts which do not prevent the own vehicle from turning safely at the present vehicle speed. Therefore, the avoidance route calculation part 17 calculates a plurality of the routes B0 with the target yaw rates varied by the constant amount within a range AR between a route B1 and a route B2, shown in FIG. 2. The route B1 is calculated using the target yaw rate obtained through the adding the maximum variation amount Δγ to the present actual yaw rate γ. The route B2 is calculated using the target yaw rate obtained through subtracting the maximum variation amount Δγ from the present actual yaw rate γ. The maximum variation amount Δγ is preferably determined in accordance with the vehicle speed of the own vehicle in such a manner that the maximum variation amount Δγ is smaller as the vehicle speed is higher.

The avoidance route calculation part 17 determines whether one of the routes B0 and the obstacle interfere with each other every time that one of the routes B0 is calculated. In this case, the avoidance route calculation part 17 determines that the route B0 and the obstacle interfere with each other when a shortest distance between the own vehicle traveling along that one of the routes B0 and the obstacle is shorter than a predetermined separation (margin). In this manner, the avoidance route calculation part 17 finds the route B0 which does not interfere with the obstacle, and sets the avoidance route along which the own vehicle should travel to the found route B0. Note that, when the avoidance route calculation part 17 finds a plurality of the routes B0 each of which does not interfere with the obstacle, the avoidance route calculation part 17 select one of the routes B0 which is calculated with the smallest magnitude of the variation amount $\Delta\gamma$, as the avoidance route, for example. When the avoidance route calculation part 17 determines that all of the routes B0 in the range AR interfere with the obstacle, the avoidance route calculation part 17 determines that "there is no avoidance route".

It should be noted that the avoidance route is set at a route among routes which allow the own vehicle to travel without departing from the traveling lane and which are within an area where the ground surface is confirmed to be present/formed.

Figure 3:
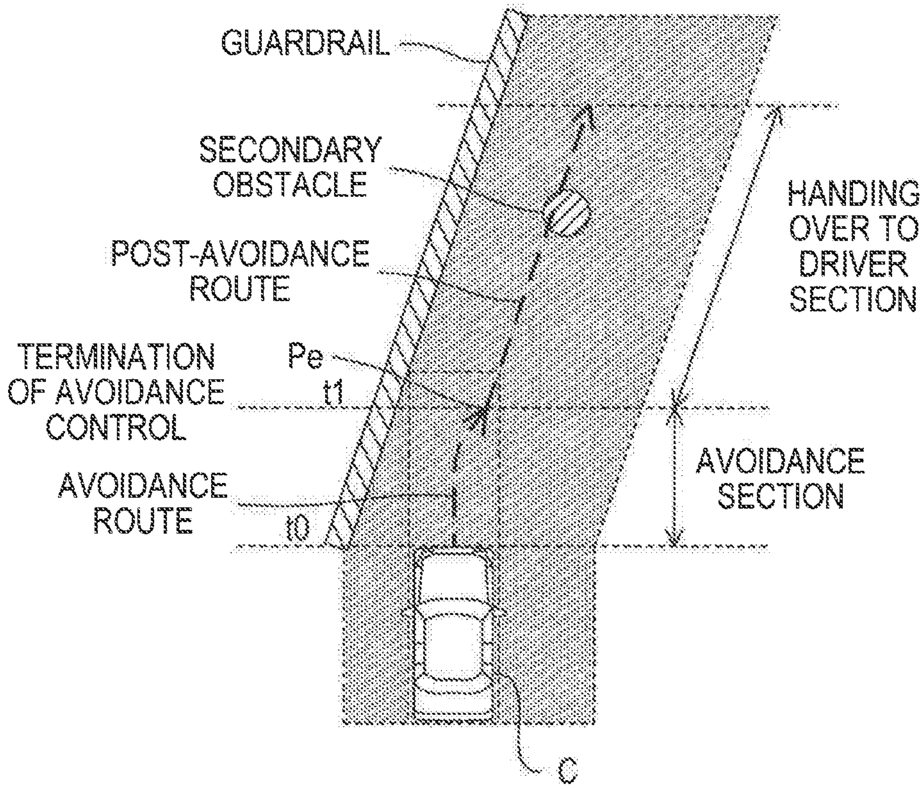
FIG. 3 is a top (plan) view for illustrating an avoidance section and a handing over to driver section.

After the avoidance route calculation part 17 sets/determines the avoidance route, the post-avoidance route calculation part 18 calculates a post-avoidance route. The post-avoidance route is a route along which the own vehicle travels within a predetermined time period after a time point at which the collision between the own vehicle and the obstacle is just avoided on the assumption that the own vehicle travels along the avoidance route. For example, as shown in FIG. 3, when the guardrail (as an obstacle) is present ahead of the own vehicle C, the avoidance route calculation part 17 determines/sets the avoidance route. While the own vehicle C travels along the avoidance route, the time-to-collision TTC becomes infinite at a time point at which the own vehicle reaches a position Pe where the (longitudinal direction of) the own vehicle becomes parallel to the guardrail (or a longitudinal direction of the guardrail), and therefore, the automatic steering control is stopped/terminated. In the present embodiment, when the collision has just been avoided, not only the automatic steering control but also the automatic brake control is stopped/terminated so that the collision avoidance assist control is terminated. The driving operation is entrusted (handed over) to the driver after a time t1 at which the collision avoidance assist control is stopped/terminated.

As shown in FIG. 3, a section where the own vehicle C travels in a period from the start of the alert to the driver to the end of the collision avoidance assist control is referred to as an "avoidance section". A section where the own vehicle C travels in a period from the end of the collision avoidance assist control to a time point at which the predetermined time (referred to as a "handing over to driver section traveling time") described later elapses from the end of the collision avoidance assist control is referred to as a "handing over to driver section". The post-avoidance route is the route (predicted traveling route) along which the own vehicle C is predicted to travel in the handing over to driver section.

The handing over to driver section is a section where there is a probability that the driver is not able to perform the driving operations appropriately if the driving operations are entrusted to the driver. In other words, the handing over to driver section is a section where it is unlikely that the driver can perform the collision avoidance driving operations for avoiding a collision of the own vehicle with another obstacle (the secondary obstacle) when the secondary obstacle appears after the collision avoidance assist control is terminated and thus the driving operations are handed over to the driver.

As described above, when a probability of a collision between the own vehicle and an obstacle (a probability of a collision of the own vehicle with an obstacle) becomes sufficiently high, the driver is alerted (receives the alert) through the operations of the buzzer 61 and the display device 62, however, the driver cannot start the driving operations for avoiding the collision with the obstacle immediately thereafter. That is, the driver needs to judge a state around the own vehicle, and then, performs driving operations in accordance with the judged state after the driver notices/recognize the alert (e.g., buzzer sound). There is always a time delay from the start of the alert to the start of the driving operations of the driver. A time from a time point at which the alert is given/produced (the start of the alert) to the driver to a time point at which the driver can start the driving operations appropriately is referred to as a "driver response required time".

For example, when the collision avoidance assist control is terminated/stopped before the time point at which the driver response required time has elapsed since the time point at which the alert was started, the driver cannot immediately start the driving operations in accordance with the state at that time point. Accordingly, the handing over to driver section is the section where the own vehicle travels from the time point at which the collision avoidance assist control is terminated/stopped to the time point at which the driver is in a state where the driver can start the driving operations in accordance with the state (in other words, the driver can start the collision avoidance operations in response to a newly appeared obstacle).

The post-avoidance route calculation part 18 calculates a time Tpcs (referred to as an "avoidance section traveling time Tpcs") for/during which the own vehicle travels in the avoidance section. The post-avoidance route calculation part 18 determines the handing over to driver section which is the traveling section of the own vehicle corresponding to the time Td (=Treq−Tpcs) obtained by subtracting the avoidance section traveling time Tpcs from the driver response required time Treq. The time Td (=Treq−Tpcs) is referred to as a "handing over to driver section traveling time Td". The handing over to driver section traveling time Td corresponds to a setting time of the present invention. The avoidance section traveling time Tpcs is a time (t1−t0) from a "time t0 at which the alert to the drive is started" to a "predicted time t1 at which the collision avoidance is predicted to be terminated/stopped". For example, the predicted time t1 is a time at which the own vehicle is predicted to pass through (or reach) the position Pe (which is an end/termination position of the avoidance section). When the own vehicle travels along the avoidance route and reaches the position Pe, the time-to-collision TTC becomes infinite. The predicted time t1 can be calculated from the avoidance route.

The post-avoidance route calculation part 18 calculates (determines through calculation) the post-avoidance route that is the route along which the own vehicle is predicted to travel in the handing over to driver section. More specifically, the post-avoidance route calculation part 18 calculates, as the post-avoidance route, a route (trajectory) of the own vehicle produced by the own vehicle on the assumption that the own vehicle travels, for the handing over to driver section traveling time Td, at a constant speed which is the same as a vehicle speed of the own vehicle at the time point (time t1) at which the collision avoidance assist control is terminated/stopped and in a direction which is the same as a direction of the own vehicle at the time point (time t1). That is, the post-avoidance route is determined on the assumption that the vehicle travels, for the time Td, with maintaining "the vehicle speed and the traveling direction" at the termination timing of the collision avoidance assist control. In this specification, traveling of the own vehicle with maintaining the vehicle speed at a constant speed without accelerating/decelerating may be referred to as a "constant speed traveling". In the example shown in FIG. 3, the thus calculated post-avoidance route is the route which extends in parallel to the guardrail.

The post-avoidance route collision determination part 19 determines whether a new obstacle (referred to as the "secondary obstacle") which has a high probability of collision with the own vehicle is present if the own vehicle travels along the post-avoidance route calculated by the post-avoidance route calculation part 18. In this case, the post-avoidance route collision determination part 19 determines whether a 3-D object which interferes with the post-avoidance route is present, based on the target object information obtained by the ambient sensor 71.

When the post-avoidance route calculation part 17 determines/sets the avoidance route and the post-avoidance route collision determination part 19 determines that the secondary obstacle (the 3-D object interfering with the avoidance route) is not present with respect to that avoidance route, the post-avoidance route collision determination part 19 permits the automatic steering control to cause the own vehicle to travel along the avoidance route to be performed. In other words, even if the avoidance route calculation part 17 successfully sets/determines the avoidance route, the automatic steering control is prohibited from being performed when the secondary obstacle is detected in the handing over to driver section.

When the automatic steering control is permitted to be performed, the post-avoidance route collision determination part 19 determines whether or not a traveling distance X is longer than a distance (L−β). The traveling distance X is a traveling distance for which the own vehicle travels from the present time point to a time point at which the own vehicle is stopped, and is calculated based on "an actual deceleration and an actual vehicle speed" of the own vehicle at the present time point. The distance (L−β) is obtained by subtracting the predetermined distance β from the distance L between the own vehicle and the obstacle at the present time point. The own vehicle cannot be stopped at a position the distance β closer to the own vehicle from the obstacle, when the traveling distance X is longer than the distance (L−β). Accordingly, when the post-avoidance route collision determination part 19 determines that the traveling distance X is longer than the distance (L−β), the post-avoidance route collision determination part 19 supplies that determination result to the control instruction part 20 to start the automatic steering control via the control instruction part 20.

When the post-avoidance route collision determination part 19 determines that the traveling distance X is longer than the distance (L−β), the control instruction part 20 calculates, based on a target yaw rate corresponding to the avoidance route determined by the avoidance route calculation part 17 and the vehicle speed at the present time point, a target steering angle required to cause an actual yaw rate to become equal to the target yaw rate. The control instruction part 20 transmits the steering instruction including information on the target steering angle for avoiding the collision to the steering ECU 50. When the steering ECU 50 receives the steering instruction, the steering ECU 50 drives the steering motor 52 based on the target steering angle to steer the turning wheels. Thereby, the automatic steering control is performed to control the traveling direction of the own vehicle in such a manner that the own vehicle travels along the avoidance route. Alternatively, the control instruction part 20 may transmit a steering instruction for avoiding the collision including information on the target yaw rate to the steering ECU 50 instead of calculating the target steering angle. In this case, the steering ECU 50 may calculate, based on the target yaw rate, "a steering angle or a steering torque" required to cause an actual yaw rate to become equal to the target yaw rate, and may drive the steering motor 52 based on the calculation result regarding the steering angle or the steering torque.

Hereinafter, specific processes performed by the support ECU 10 will be described with reference to the flowcharts of FIG. 4 to FIG. 9.

Figure 4:
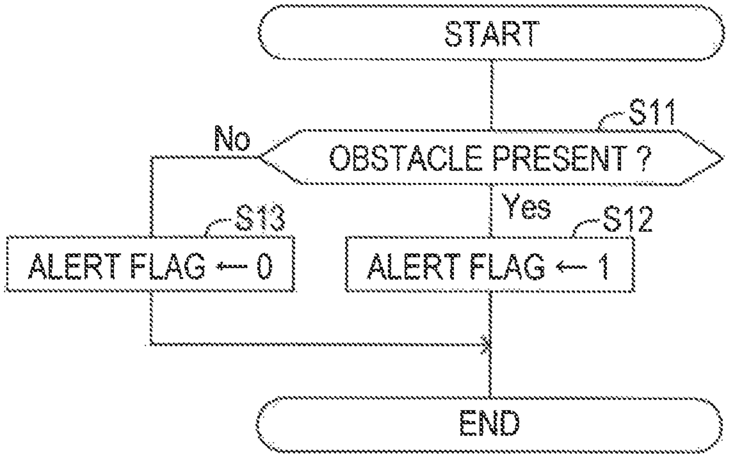
FIG. 4 is a flowchart for illustrating an alert flag setting routine.

When and after an unillustrated ignition switch is turned on, the support ECU 10 executes an alert flag setting routine shown in FIG. 4 repeatedly every time a predetermined time period (cycle) elapses.

Firstly, the support ECU 10 determines whether or not the obstacle is present ahead of the own vehicle at Step S11. When the obstacle is present ahead of the own vehicle, the support ECU 10 sets an alert flag to "1" at Step S12. An initial value of the alert flag is "0". On the other hand, when the obstacle is not present ahead of the own vehicle, the support ECU 10 sets the alert flag to "0" at Step S13. After executing the setting process (S12, S13) of the alert flag, the support ECU 10 tentatively terminates the alert flag setting routine.

Figure 5:
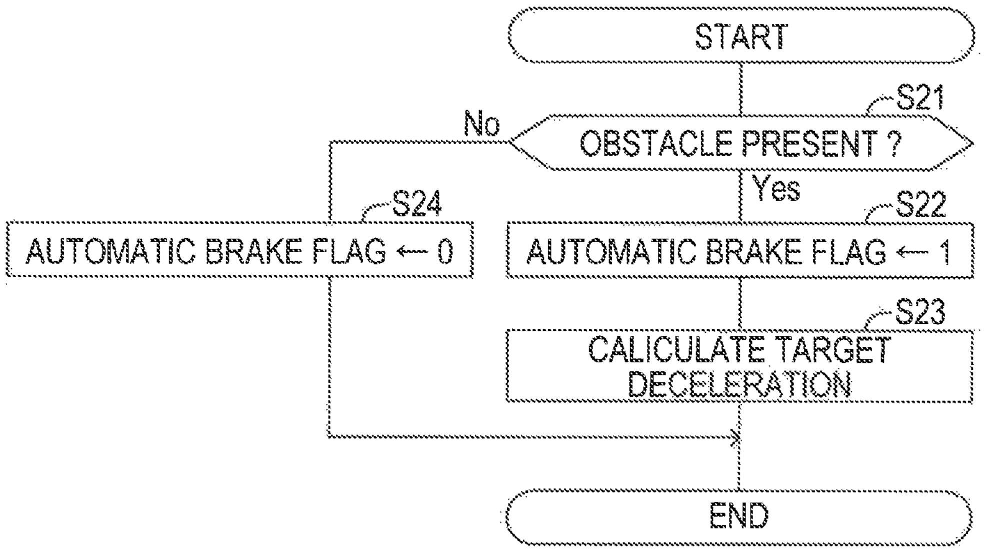
FIG. 5 is a flowchart for illustrating an automatic brake flag setting routine.

Meanwhile, when and after the ignition switch is turned on, the support ECU 10 executes an automatic brake flag setting routine illustrated in FIG. 5 repeatedly every time a predetermined time period (cycle) elapses.

Firstly, the support ECU 10 determines whether or not the obstacle is present ahead of the own vehicle at Step S21. When the obstacle is present ahead of the own vehicle, the support ECU 10 sets an automatic brake flag to "1" at Step S22. An initial value of the automatic brake flag is "0". Subsequently, the support ECU 10 calculates the target deceleration at Step S23. The calculation of the target deceleration is made by the target deceleration calculation part 16.

On the other hand, when the obstacle is not present ahead of the own vehicle, the support ECU 10 sets the automatic brake flag to "0" at Step S24. After executing the process of Step S23 or Step S24, the support ECU 10 tentatively terminates the automatic brake flag setting routine.

Figure 6:
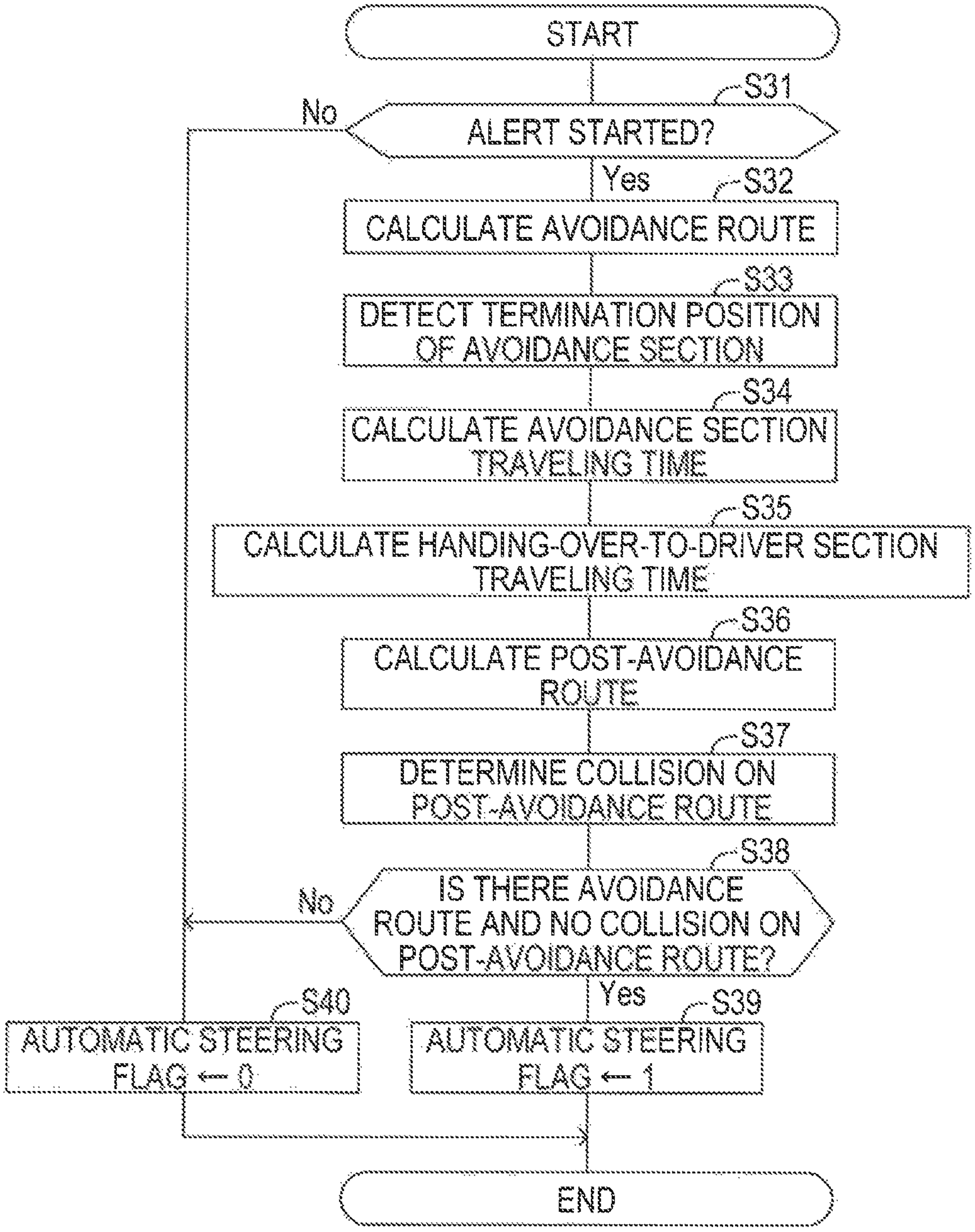
FIG. 6 is a flowchart for illustrating an automatic steering flag setting routine.

When and after the ignition switch is turned on, the support ECU 10 executes an automatic steering flag setting routine illustrated in FIG. 6 repeatedly every time a predetermined time period (cycle) elapses.

Firstly, the support ECU 10 determines whether or not the alert to the driver has been started at Step S31. When the alert to the driver has not been started, the support ECU 10 sets an automatic steering flag to "0" at Step S40. An initial value of the automatic steering flag is "0". On the other hand, when the alert to the driver has been started, the support ECU 10 calculates the avoidance route at Step S32. This calculation is made by the avoidance route calculation part 17.

Subsequently, the support ECU 10 detects/calculates the termination/end position of the avoidance section at Step S33. In this case, the support ECU 10 detects/calculates, as the termination/end position, a position at which the collision between the own vehicle and the obstacle is successfully avoided on the assumption that the own vehicle travels along the avoidance route. In the present embodiment, the termination/end position is the position where the time-to-collision TTC becomes infinite. The processes from the Step S33 to Step S36 described later are executed by the post-avoidance route calculation part 18.

Subsequently, the support ECU 10 calculates the avoidance section traveling time Tpcs at Step S34. As described above, the avoidance section traveling time Tpcs is the time (t1−t0) from the "time t0 at which the alert to the drive is started" to the "predicted time t1 at which the collision avoidance is predicted to be terminated/stopped (or complete)". The predicted time t1 is the time at which the own vehicle arrives at the termination/end position of the avoidance section.

Subsequently, the support ECU 10 calculates the handing over to driver section traveling time Td at Step S35. The handing over to driver section traveling time Td is the time (Treq−Tpcs) obtained by subtracting the avoidance section traveling time Tpcs from the driver response required time Treq, and may be referred to as a "remaining time". The driver response required time Treq represents the time from at which the alert to the driver is started to the time point at which the driving operations is appropriately started by the driver. The driver response required time Treq has been stored in advance in the support ECU 10.

Incidentally, there is a case where the handing over to driver section traveling time Td (=Treq−Tpcs) becomes a negative value. In this case, the calculation of the post-avoidance route made at Step S36 described later becomes unnecessary, and it is determined that the secondary obstacle is not present on the post-avoidance route at Step S37 described later.

Subsequently, the support ECU 10 calculates the post-avoidance route that is the route (predicted traveling route) along which the own vehicle is predicted to travel in the handing over to driver section at Step S36. In the present embodiment, when the collision avoidance is terminated/stopped (i.e., when the own vehicle passes through (reaches) the termination/end position of the avoidance section), the automatic brake control and the automatic steering control are terminated. Therefore, the post-avoidance route is the route (trajectory) of the own vehicle produced by the own vehicle on the assumption that the own vehicle travels (or makes the constant speed traveling), for the handing over to driver section traveling time Td, with keeping "the vehicle speed and the direction of the own vehicle) at those at the time point (time t1) at which the automatic brake control and the automatic steering control are terminated.

Subsequently, at Step S37, the support ECU 10 determines whether or not the new secondary obstacle which is likely to collide with the own vehicle is present if the own vehicle travels along the post-avoidance route.

Next, at Step S38, the support ECU 10 determines whether or not the avoidance route has been set/determined and whether or not no secondary obstacle is present with respect to the post-avoidance route.

When the avoidance route has been set/determined and no secondary obstacle is present with respect to the post-avoidance route (S38: Yes), the support ECU 10 sets the automatic steering flag to "1" at Step S39. On the other hand, when the avoidance route has not been set/determined (i.e., when the avoidance route has not been successfully found) and/or when the secondary obstacle is present with respect to the post-avoidance route (S38: No), the support ECU 10 sets the automatic steering flag to "0" at Step S40. The processes from the Step S37 to S40 are executed by the post-avoidance route collision determination part 19.

After executing the setting process (S39, S40) of the automatic steering flag, the support ECU 10 tentatively terminates the automatic steering flag setting routine.

Figure 7:
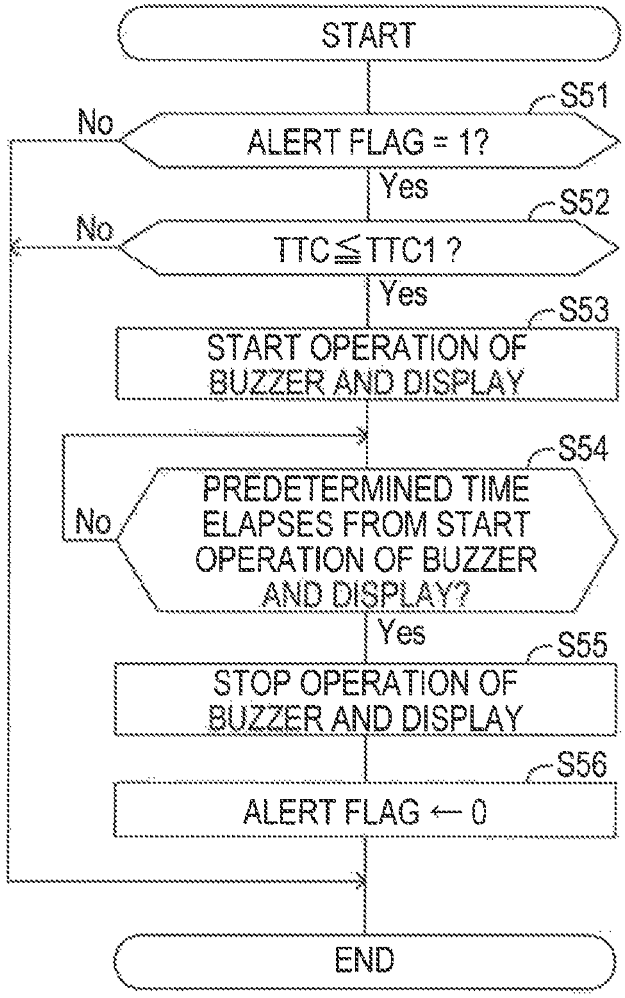
FIG. 7 is a flowchart for illustrating an alert control routine.

When and after the ignition switch is turned on, the support ECU 10 executes an alert control routine illustrated in FIG. 7 repeatedly every time a predetermined time period (cycle) elapses.

Firstly, the support ECU 10 determines whether or not the alert flag is "1" at Step S51. When the alert flag is "0" (S51: No), the support ECU 10 tentatively terminates the alert control routine. When the alert flag is "1" (S51: Yes), the support ECU 10 determines whether or not the time-to-collision TTC is equal to or shorter than the first collision determination threshold TTC1 at Step S52.

When the time-to-collision TTC is longer than the first collision determination threshold TTC1 (S52: No), the support ECU 10 tentatively terminates the alert control routine. When the time-to-collision TTC is equal to or shorter than the first collision determination threshold TTC1 due to the increase in the probability that the own vehicle collides with the obstacle (S52: Yes), the support ECU 10 transmits the alert instruction to the alert ECU 60 at Step S53. Thereby, the sound is generated from the buzzer 61, and the operation status of the collision avoidance assist control is displayed on the display device 62.

Subsequently, the support ECU 10 repeatedly determines whether or not a predetermined time has elapsed since the start of the operations of the buzzer 61 and the display device 62, at Step S54. The support ECU 10 repeats making the determination at Step 54 until the predetermined time has elapsed. When the predetermined time has elapsed, the support ECU 10 transmits an alert stop instruction to the alert ECU 60 at Step S55.

Thereby, generating the sound form the buzzer 61 is stopped, and displaying the operational status on the display device 62 is stopped.

Subsequently, the support ECU 10 sets the alert flag to "0" at Step S56, and then, terminates the alert control routine tentatively.

Figure 8:
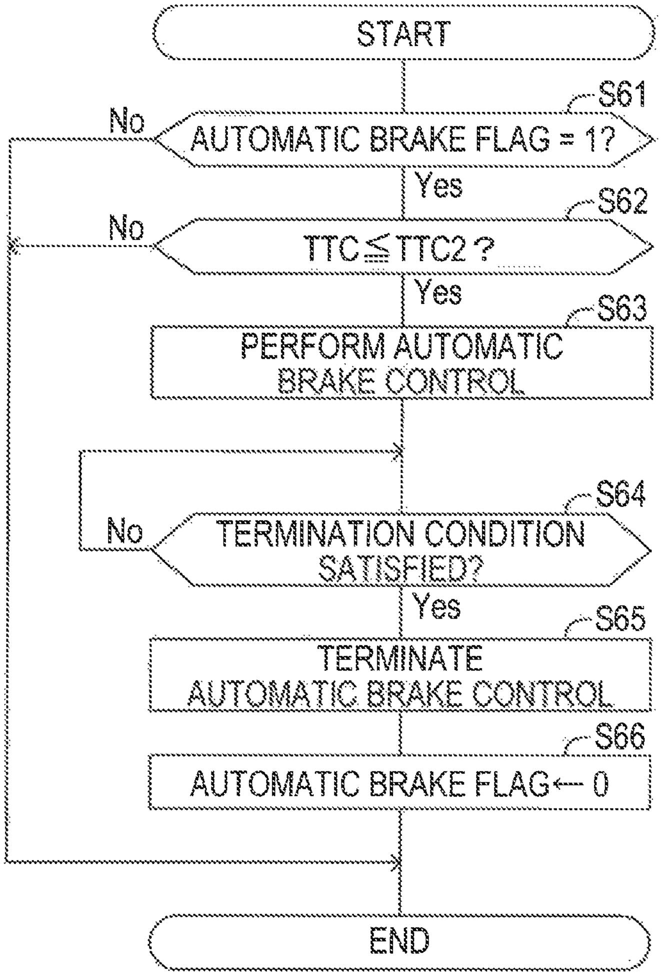
FIG. 8 is a flowchart for illustrating an automatic brake control routine.

When and after the ignition switch is turned on, the support ECU 10 executes an automatic brake control routine illustrated in FIG. 8 repeatedly every time a predetermined time period (cycle) elapses.

Firstly, the support ECU 10 determines whether or not the automatic brake flag is "1" at Step S61. When the automatic brake flag is "0" (S61: No), the support ECU 10 tentatively terminates the automatic brake control routine. When the automatic brake flag is "1" (S61: Yes), the support ECU 10 determines whether or not the time-to-collision TTC is equal to or shorter than the second collision determination threshold TTC2 at Step S62.

When the time-to-collision TTC is longer than the second collision determination threshold TTC2 (S62: No), the support ECU 10 tentatively terminates the automatic brake control routine. When the time-to-collision TTC is equal to or shorter than the second collision determination threshold TTC2 due to the increase in the probability that the own vehicle collides with the obstacle increases (S62: Yes), the support ECU 10 executes the automatic brake control at Step S63. More specifically, the support ECU 10 transmits the braking instruction including the information on the target deceleration calculated at Step S23 (refer to FIG. 5) to the brake ECU 30, and transmits the zero torque instruction for requiring the engine ECU 40 to change the driving torque to zero to the engine ECU 40. Consequently, the braking force is given to the own vehicle so that the own vehicle decelerates at the target deceleration.

Subsequently, the support ECU 10 determines whether or not a termination condition of the automatic brake control is satisfied at Step S64. In the present embodiment, the termination condition is satisfied when the collision between the own vehicle and the obstacle has just been avoided. For example, the termination condition is satisfied when the time-to-collision TTC becomes infinite (that is, when the own vehicle has reached the termination/end position of the avoidance section). The support ECU 10 repeats the above determination until the termination/end condition becomes satisfied. Therefore, the automatic brake control continues being executed while the support ECU 10 repeats the above determination.

When the termination condition of the automatic brake control becomes satisfied (S64: Yes), the support ECU 10 terminates the automatic brake control at Step S65. Thus, the respective instructions to the brake ECU 30 and the engine ECU 40 are stopped being transmitted.

Subsequently, the support ECU 10 sets the automatic brake flag to "0" at Step S66, and thereafter, tentatively terminates the automatic brake control routine.

It should be noted that the automatic brake control is started again when the predetermined start permission condition (for example, the condition depending on probability of the presence of the obstacle and a collision probability with the obstacle) becomes satisfied again after the termination of the automatic brake control that has been performed.

Figure 9:
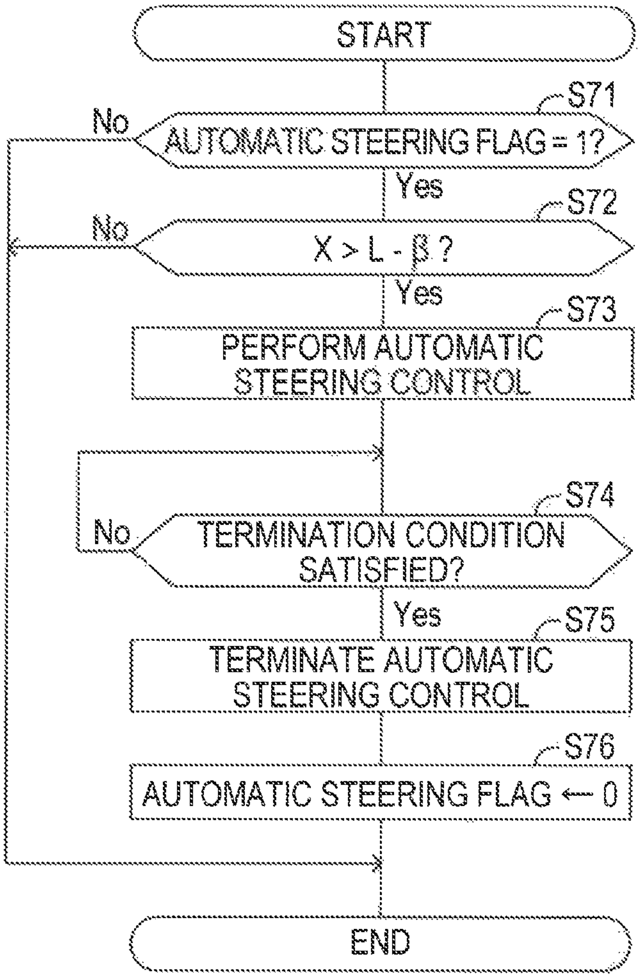
FIG. 9 is a flowchart for illustrating an automatic steering control routine.

When and after the ignition switch is turned on, the support ECU 10 executes the automatic steering control routine illustrated in FIG. 9 repeatedly every time a predetermined time period (cycle) elapses.

Firstly, the support ECU 10 determines whether or not the automatic steering flag is "1" at Step S71. When the automatic steering flag is "0" (S71: No), the support ECU 10 tentatively terminates the automatic steering control routine. When the automatic steering flag is "1" (S71: Yes), the support ECU 10 determines whether or not the traveling distance X is longer than the distance (L−β) at Step S72. As described, the traveling distance X is the traveling distance for which the own vehicle travels from the present time point to the time point at which the own vehicle stops, and is calculated based on "the actual deceleration and the actual vehicle speed" of the own vehicle at the present time point. The distance L is a distance between the own vehicle and the obstacle at the present time point. The distance β is a margin distance between the own vehicle and the obstacle when the own vehicle is stopped to avoid the collision.

When the traveling distance X is equal to or shorter than the distance (L−β) (S72: No), the support ECU 10 tentatively terminates the automatic steering control routine. When the traveling distance X is longer than the distance (L−β) (S72: Yes), the support ECU 10 performs the automatic steering control at Step S73. More specifically, the support ECU 10 transmits, to the steering ECU 50, the steering instruction for avoiding the collision. The steering instruction includes the information on the target steering angle which can realize the target yaw rate corresponding to the avoidance route calculated at Step S32 (refer to FIG. 6). Thereby, the automatic steering control is started, and the traveling direction of the own vehicle is controlled in such a manner that the own vehicle travels along the avoidance route.

Subsequently, the support ECU 10 determines whether or not the termination condition of the automatic steering control is satisfied at Step S74. In the present embodiment, the termination condition is satisfied when the collision between the own vehicle and the obstacle has just been avoided. For example, the termination condition is satisfied when the time-to-collision TTC becomes infinite (i.e., when the own vehicle has reached the termination/end position of the avoidance section). The support ECU 10 repeats the above determination until the termination condition becomes satisfied. Thus, the automatic steering control continues being performed until the termination condition becomes satisfied.

When the termination condition of the automatic steering control becomes satisfied (S74: Yes), the support ECU 10 terminates the automatic steering control at Step S75. Therefore, the steering instruction to the steering ECU 50 is stopped being transmitted.

Subsequently, the support ECU 10 sets the automatic steering flag to "0" at Step S76, and thereafter, tentatively terminates the automatic steering control routine.

It should be noted that the automatic steering control is started again when the predetermined start permission condition becomes satisfied after the termination of the automatic steering control that has been performed.

According to the collision avoidance assist apparatus of the present embodiment described above, not only the avoidance route for avoiding the collision between the own vehicle and the obstacle but also the post-avoidance route is calculated. The post-avoidance route is a route along which the own vehicle is predicted to travel in a period from the time point at which the own vehicle passes through (reaches) the termination/end position of the avoidance route to the time point at which the handing over to driver section traveling time Td elapses. Subsequently, the collision avoidance assist apparatus determines whether or not the secondary obstacle which has a high probability of collision with the own vehicle is present with respect to (or on) the post-avoidance route in a case where the own vehicle travels along the post-avoidance route. When it is determined that the secondary obstacle is present with respect to (or on) the post-avoidance route, the automatic steering control which causes the own vehicle to travel along the avoidance route is prohibited. That is, the automatic steering control is prohibited even if the avoidance route exists in the avoidance section. As a result, a possibility of the occurrence of the secondary collision (collision of the own vehicle with the secondary obstacle) can be reduced. Furthermore, the handing over to driver section traveling time Td is determined based on the driver response required time Treq and the avoidance section traveling time Tpcs, and therefore, the post-avoidance route can be calculated appropriately.

First Modified Example

In the above embodiment, the termination condition of the automatic brake control becomes satisfied so that the automatic brake control is terminated/stopped when the collision between the own vehicle and the obstacle has just been avoided. Instead, in some embodiments, the collision avoidance assist apparatus is configured to continue the automatic brake control until the own vehicle is stopped (i.e., until the vehicle speed becomes zero). In this case, the support ECU 10 calculates the post-avoidance route at Step S36 as follows. That is, the support ECU 10 calculates, as the post-avoidance route, a predicted route along which the own vehicle will travel on the assumption that the own vehicle travels with maintaining the direction (moving direction, turning angle, deviation angle from the direction of the lane) of the own vehicle at the time point at which the automatic steering control has just been terminated/stopped (i.e., when the own vehicle has passed through (has reached) the termination/end position of the avoidance section), and the own vehicle is decelerated at the target deceleration calculated at Step S23, for the handing over to driver section traveling time Td. Therefore, the collision avoidance assist apparatus according to this modified embodiment can shorten the handing over to driver section as compared with the above embodiment. In other words, the post-avoidance route is shortened. Accordingly, the possibility of the occurrence of the secondary collision can be further reduced.

Second Modified Example

In the above embodiment, once the collision avoidance assist control (i.e., the automatic brake control and the automatic steering control) is terminated/completed/stopped, the collision avoidance assist control is not started again unless the predetermined start permission condition again becomes satisfied. For this reason, in the above embodiment, the driving operation is entrusted to (handed over to) the driver when and after the (first) collision avoidance assist control has been terminated. In contrast, if the collision avoidance assist apparatus is configured to be able to start a next/second collision avoidance assist control with respect to the secondary obstacle again at a relatively early timing after the first collision avoidance assist control has been terminated/completed/stopped, the thus configured collision avoidance assist apparatus can hand over "the avoidance operation using the steering" to the "next/second collision avoidance assist control" after the first collision avoidance assist control is terminated/completed/stopped. However, there is a delay time (referred to as an "assist control handing over time Tc") from the time point at which the first collision avoidance assist control has been terminated to the time point at which the next/second collision avoidance control (the automatic brake control and the automatic steering control) with respect to the secondary obstacle is started. In view of the above, the support ECU 10 of the collision avoidance assist apparatus according to the second modified example calculates the post-avoidance route through using the "assist control handing over time Tc" instead of the "handing over to driver section traveling time Td" used in the above embodiments.

Figure 10:
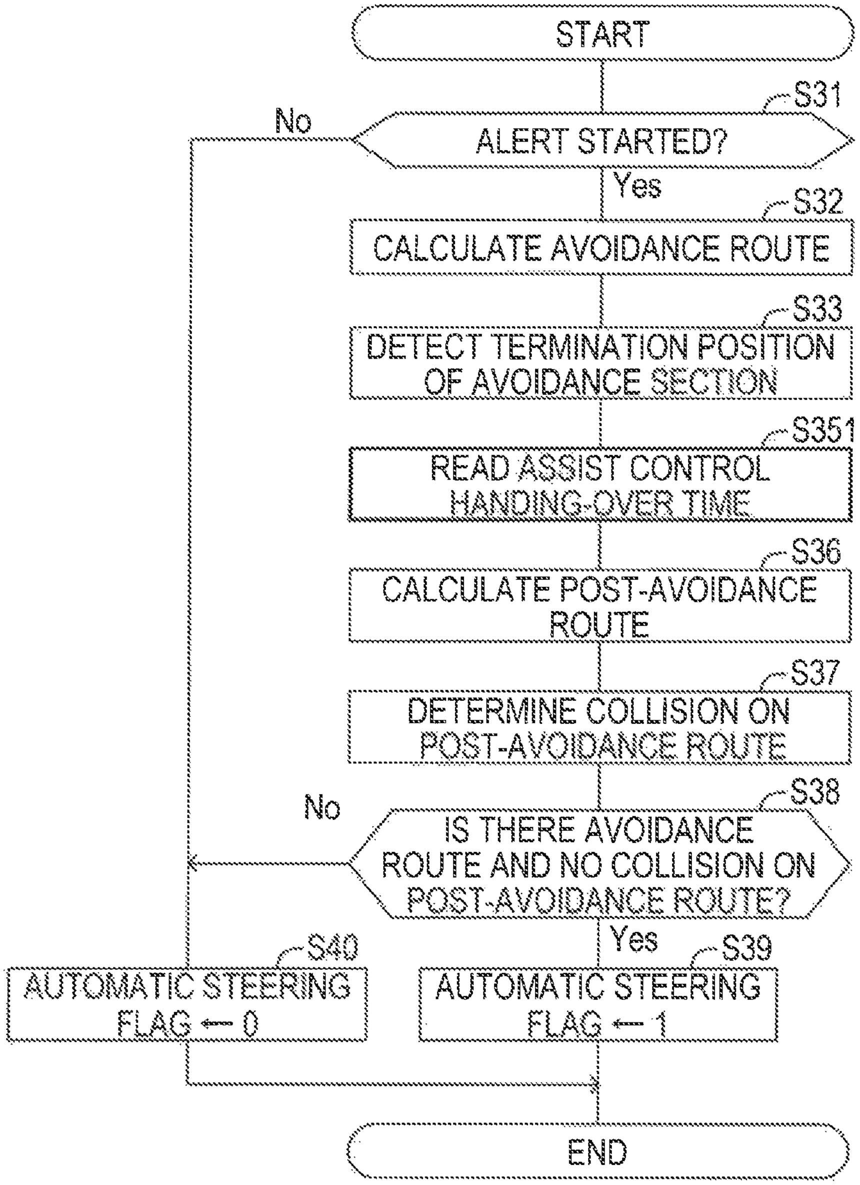
FIG. 10 is a flowchart for illustrating an automatic steering flag setting routine of a modified example.
Figure 11:
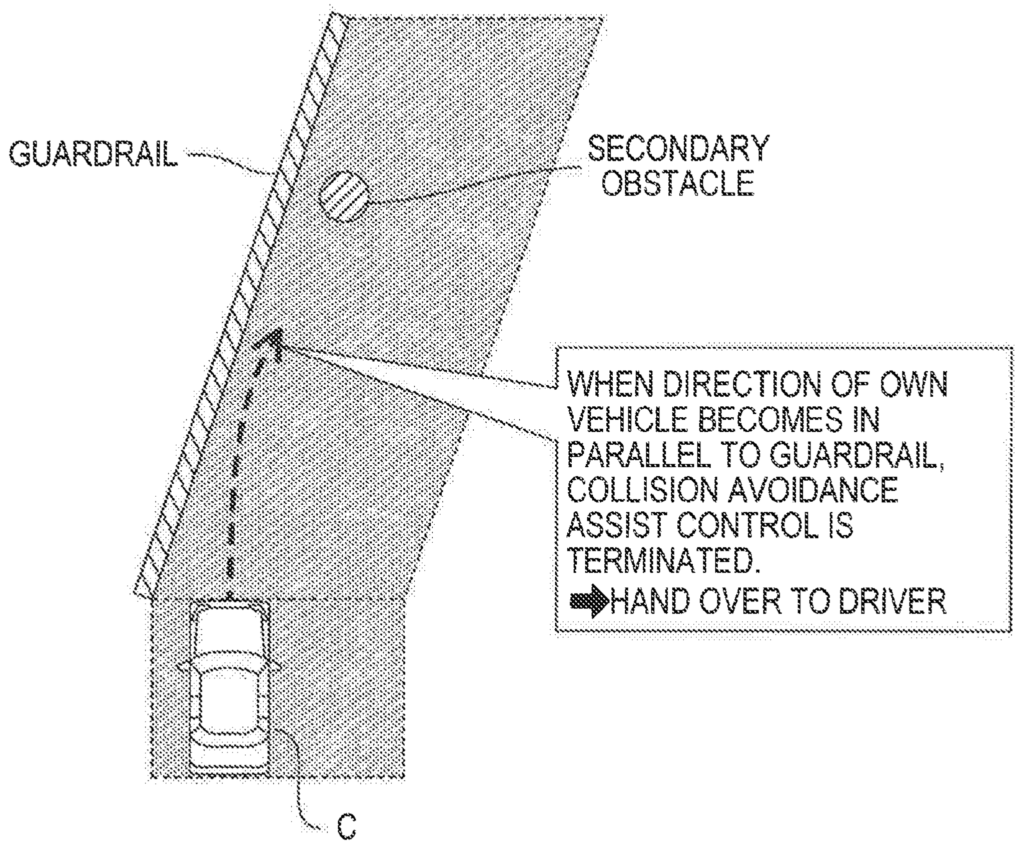
FIG. 11 is a top (plan) view for illustrating a situation where a secondary obstacle is present on a route of the own vehicle after an avoidance of a collision.

An automatic steering flag setting routine executed by the support ECU 10 according to the second modified example is illustrated in FIG. 10. This automatic steering flag setting routine is the same as the automatic steering flag setting routine of the above embodiment shown in FIG. 6, except that Step S34 shown in FIG. 6 is deleted, and Step S35 shown in FIG. 6 is replaced with/by Step S351.

The support ECU 10 reads out the assist control handing over time Tc at Step S351. The assist control handing over time Tc has been stored in the memory in advance. The support ECU 10 calculates the post-avoidance route using the assist control handing over time Tc at Step S36. A section where the own vehicle travels during the assist control handing over time Tc is referred to as an "assist control handing over section". The assist control handing over section is a section from the termination/end position of the avoidance route to a position at which own vehicle reaches when the own vehicle travels for the assist control handing over time Tc. The assist control handing over section substitutes for the handing over to driver section of the above embodiments. The support ECU 10, at Step S36, calculates the post-avoidance route which is the route (trajectory) of the own vehicle produced by the own vehicle on the assumption that the own vehicle travels (or makes the constant speed traveling), for the assist control handing over time Tc, with keeping "the vehicle speed and the direction of the own vehicle (deviation angle, turning angle)" at those at the time point (time t1) at which the collision avoidance assist control is terminated.

According to the second modified example, the post-avoidance route is calculated based on the assist control handing over time Tc. In addition, the automatic steering control is prohibited, when it is determined that the secondary obstacle which is highly likely to collide with the own vehicle is present if the own vehicle travels along the post-avoidance route. In other words, the automatic steering control is prohibited even if the avoidance route exists in the avoidance section. Accordingly, the modified example can reduce the possibility of the occurrence of the secondary collision.

The first modified example and the second modified example can be combined. In this combined configuration, the support ECU 10, at Step S36 shown in FIG. 10, calculates, as the post-avoidance route, a route (trajectory) of the own vehicle produced by the own vehicle on the assumption that the own vehicle travels for the assist control handing over time Tc with keeping "the direction of the own vehicle (deviation angle, turning angle)" at the direction of the own vehicle at the time point at which the automatic steering control is terminated (i.e., when the own vehicle has passed through (has reached) the termination/end position of the avoidance section), and the own vehicle is decelerated at the target deceleration calculated at Step S23, for the assist control handing over time Tc.

The assist control handing over time Tc corresponds to the setting time of the present invention. The setting time may not be necessarily the same as the assist control handing over time Tc. The setting time may be a time determined/set based on the assist control handing over time Tc. For example, the setting time may be a time (=Tc+ΔTc) obtained by adding a safe margin time ΔTc to the assist control handing over time Tc.

Third Modified Example

Only one avoidance route is selected in the above embodiment. However, in some embodiments, a plurality of the avoidance routes are calculated. When the support ECU 10 is configured to calculate, as candidates, a plurality of the avoidance routes, the support ECU 10 calculates respective post-avoidance routes for each of the avoidance routes, and determines whether or not the own vehicle is likely to collide with the secondary obstacle with respect to the respective post-avoidance routes. That is, for each of the respective post-avoidance routes, the support ECU 10 determines whether or not the secondary obstacle is present. When there is a post-avoidance rout having no probability of the collision of the own vehicle with the secondary obstacle, the support ECU 10 selects one of the avoidance routes which is linked to (connected with) that post-avoidance route as the avoidance route for the automatic steering control.

Fourth Modified Example

Furthermore, the post-avoidance route is selected by an apparatus adopting features of both the above present embodiment and the second modified example. For example, the support ECU 10 may calculate the post-avoidance route using either the handing over to driver section traveling time Td or the assist control handing over time Tc, whichever is shorter. More specifically, when the handing over to driver section traveling time Td is shorter than the assist control handing over time Tc, the support ECU 10 may calculate the post-avoidance route based on the handing over to driver section traveling time Td. When the assist control handing over time Tc is shorter than the handing over to driver section traveling time Td, the support ECU 10 may calculate the post-avoidance route based on the assist control handing over time Tc.

Fifth Modified Example

In the above present embodiment, the direction (traveling/moving direction) of the own vehicle is changed by the automatic steering control (control of the turning angle of the turning wheels). Instead of this automatic steering control, the direction of the own vehicle may be changed by a differential braking force control which utilizes a difference between a braking force of a right wheel and a braking force of a left wheel. The differential braking force control is the control to change the direction of the own vehicle by producing the difference between the "braking force of the right wheel(s) (a front-right wheel and/or a rear-right wheel)" generated by the friction brake mechanism 32 and the "braking force of the left wheel(s) (a front-left wheel and/or a rear-left wheel)" generated by the friction brake mechanism 32. Therefore, not only the automatic steering control but also the differential braking forth control is adopted as the automatic turn control of the present invention.

Although the collision avoidance assist apparatus according to the present embodiment and the modifications have been described above, the present invention is not limited to the above embodiment and modifications, and various modifications can be made without departing from the object of the present invention.

What is claimed is:

1. A collision avoidance assist apparatus comprising:

an ambient sensor that detects an obstacle which is present ahead of an own vehicle; and one or more processors programmed to:

alert a driver when a collision probability of a collision of said own vehicle with said detected obstacle exceeds a threshold;

calculate an avoidance route for avoiding said collision between said own vehicle and said detected obstacle;

perform a collision avoidance assist control including an automatic brake control and an automatic turn control when said collision probability exceeds a threshold, said automatic brake control being a control for generating a braking force at respective wheels, and said automatic turn control being a control for changing a traveling direction of said own vehicle in such a manner that said own vehicle travels along said avoidance route;

calculate, as a termination position of said avoidance route, a position at which said collision between said own vehicle and said obstacle is predicted to have been avoided on the assumption that said own vehicle travels along said avoidance route, and calculate, as a post-avoidance route, a route along which said own vehicle is predicted to travel for a period from a first time point at which said own vehicle passes through said termination position to a second time point at which a setting time elapses since said first time point;

determine whether or not another obstacle that interferes with said post-avoidance route is present on the assumption that said own vehicle travels along said post-avoidance route; and prohibit performing said automatic turn control when said another obstacle is determined to be present.

2. The collision avoidance assist apparatus according to claim 1, wherein the one or more processors are further programmed to:

have stored in advance a driver response required time which is a time from a time point at which said alert is started to a time point at which said driver can start a driving operation for avoiding a collision between said own vehicle and an obstacle;

calculate a remaining time obtained by subtracting, from said driver response required time, a time from a time point at which an alert is started to a time point at which said own vehicle passes through said termination position; and set said setting time to said calculated remaining time.

3. The collision avoidance assist apparatus according to claim 1, wherein said one or more processors if further programmed to use, as said setting time, a time which has been set based on an assist control handing over time which is a time from a time point at which the own vehicle passes through said termination position to a time point at which said collision avoidance assist control for avoiding a newly detected obstacle can be started.

4. The collision avoidance assist apparatus according to claim 1, wherein said one or more processors is further programmed to calculate said post-avoidance route on the assumption that said own vehicle travels for said setting time at a vehicle speed of said own vehicle when said own vehicle passes through said termination position with keeping a turning angle when said own vehicle passes through said termination position.

5. The collision avoidance assist apparatus according to claim 2, wherein said one or more processors is further programmed to calculate said post-avoidance route on the assumption that said own vehicle travels for said setting time at a vehicle speed of said own vehicle when said own vehicle passes through said termination position with keeping a turning angle when said own vehicle passes through said termination position.

6. The collision avoidance assist apparatus according to claim 3, wherein said one or more processors is further programmed to calculate said post-avoidance route on the assumption that said own vehicle travels for said setting time at a vehicle speed of said own vehicle when said own vehicle passes through said termination position with keeping a turning angle when said own vehicle passes through said termination position.

7. The collision avoidance assist apparatus according to claim 1, wherein said one or more processors is further programmed to calculate said post-avoidance route on the assumption that said own vehicle is decelerated at a given deceleration for said setting time with keeping a turning angle when said own vehicle passes through said termination position.

8. The collision avoidance assist apparatus according to claim 2, wherein said one or more processors is further programmed to calculate said post-avoidance route on the assumption that said own vehicle is decelerated at a given deceleration for said setting time with keeping a turning angle when said own vehicle passes through said termination position.

9. The collision avoidance assist apparatus according to claim 3, wherein said one or more processors is further programmed to calculate said post-avoidance route on the assumption that said own vehicle is decelerated at a given deceleration for said setting time with keeping a turning angle when said own vehicle passes through said termination position.

* * * * *